W. B. CROCKER.
DIPPING MACHINE.
APPLICATION FILED MAY 5, 1908.
914,803.
Patented Mar. 9, 1909.
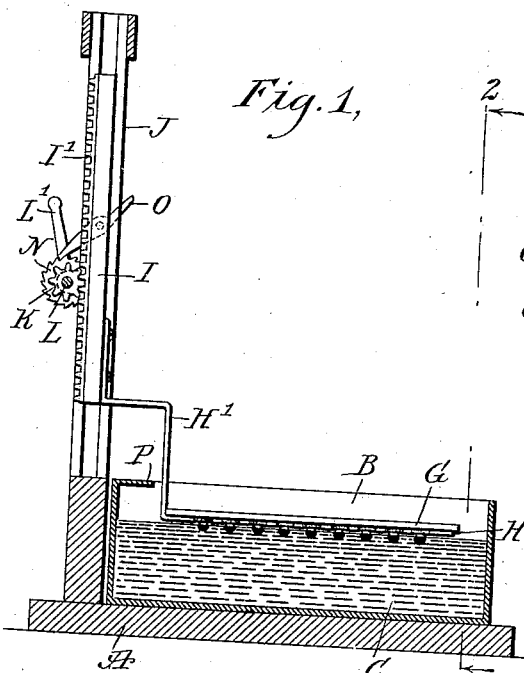
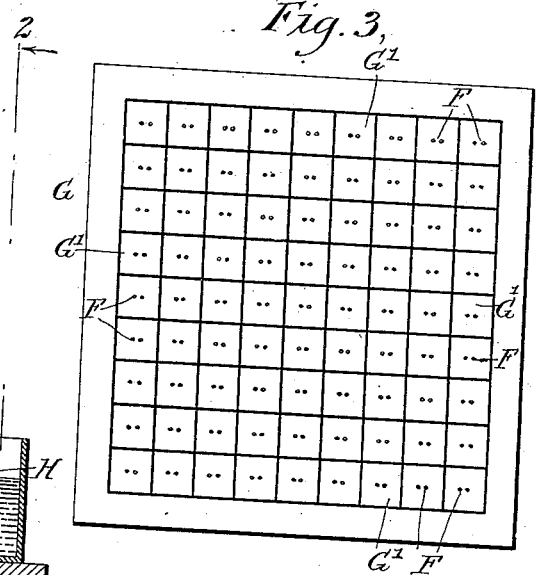
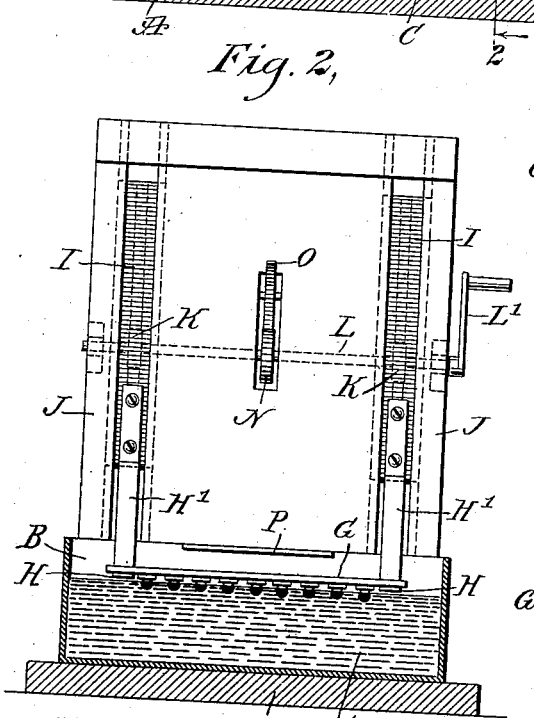
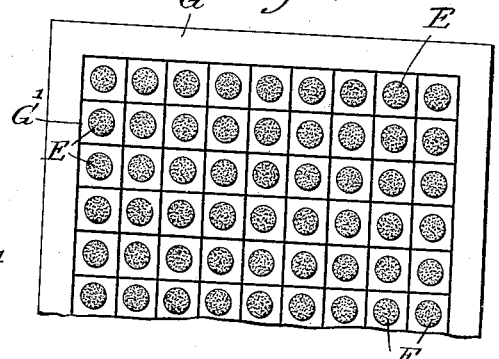
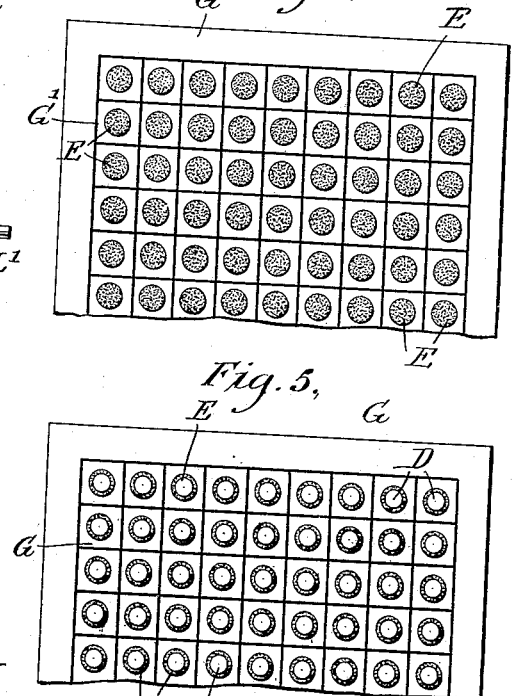
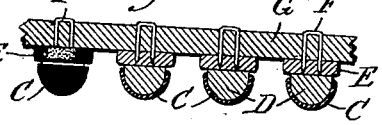
WITNESSES
Edward Thorpe.
INVENTOR
William B. Crocker
BY
ATTORNEYS

UNITED STATES PATENT OFFICE.

WILLIAM B. CROCKER, OF NEW YORK, N. Y.

DIPPING-MACHINE.

No. 914,803.

Specification of Letters Patent.

Patented March 9, 1909.

Application filed May 5, 1908. Serial No. 430,906.

*To all whom it may concern:*

Be it known that I, WILLIAM B. CROCKER, a citizen of the United States, and a resident of the city of New York, borough of Brooklyn, in the county of Kings and State of New York, have invented a new and Improved Dipping-Machine, of which the following is a full, clear, and exact description.

The invention relates to confectionery machines, and its object is to provide a new and improved dipping machine, more especially designed for coating marshmallows held on biscuits or cakes with chocolate, icing, cocoanut or other coating material and without submerging the biscuits or cakes in the coating material.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a transverse section of the improvement; Fig. 2 is a sectional front elevation of the same on the line 2—2 of Fig. 1; Fig. 3 is an enlarged plan view of one of the trays; Fig. 4 is a like view of the same and showing the biscuits or cakes in position on the tray; Fig. 5 is a similar view of the tray showing the biscuits or cakes in position on the tray and the marshmallows supported on the biscuits or cakes; and Fig. 6 is an enlarged sectional side elevation of the same.

On a table or frame A is set a pan B for containing chocolate, icing, cocoanut or other coating material C used for coating marshmallows D attached to biscuits or cakes E held on retaining devices F, preferably in the form of staples driven in the tray G, of a size somewhat less than the pan B, to permit of placing the tray into the pan B, as shown in Figs. 1 and 2 and as hereinafter more fully described. The retaining devices F project from the face of the tray G, and each retaining device is arranged within a field G' laid off on the face of the table G by suitable lines or other means, as indicated in Figs. 3, 4 and 5. The retaining devices F project a sufficient distance from the face of the tray G for receiving a biscuit or cake E, as shown in Fig. 4, it being understood that on each biscuit or cake E is placed a marshmallow D, preferably of semi-spherical shape, as indicated in Fig. 6. The biscuits or cakes E and the marshmallows D superimposed on the said biscuits or cakes, may be placed in position by hand or by suitable mechanical devices.

After the tray G is filled with the cakes E and the marshmallows D superimposed thereon, then the tray is turned upside down and placed in this position on transversely-extending supports H, in the form of bars, extending transversely in the pan B, above the level of the coating material C contained in the said pan. The supports H are provided at their rear ends with upwardly-extending arms $H^1$ attached to slides I mounted to slide up and down in suitable guideways arranged in standards J erected on the table or frame A. On the slides I and preferably at the back thereof are secured or formed racks I' in mesh with gear wheels K secured on a shaft L journaled in suitable bearings arranged on the standards J, and on the shaft L is secured a ratchet wheel N engaged by a pawl O, to hold the ratchet wheel N and consequently the shaft L against turning, with a view to support the tray G the desired distance above the coating material C contained in the pan B. On one end of the shaft L is secured a crank arm L' under the control of the operator, to permit the latter to lower the supports H and consequently the tray G, with a view to bring the tray always into the proper relation relative to the coating material C as the latter is gradually used up. It is understood that when it is desired to lower the supports H and the tray G, the operator first disengages the pawl O from the ratchet wheel N before turning the crank arm L' with a view to lower the slides I and the supports H. On the rear end of the pan B and approximately midway thereof is arranged a rest P projecting forwardly, to permit the operator to rest the rear end of the tray G on the said rest with a view to allow the surplus material to drip back into the pan B.

The operation is as follows: When the tray G has been filled with the biscuits or cakes E with the marshmallows superimposed thereon, then the tray is turned upside down and placed with its sides on the supports H, so that the marshmallows are immersed in the coating material C contained in the pan B. In practice, the supports H are adjusted in such a manner that the level of the coating material C is close to the under surface of the biscuits or cakes E, so that the coating material covers the marshmallows only, without danger of submerging or coating the biscuits or cakes E (see Fig. 6). After the marshmallows D are coated, the tray G is lifted off the supports H, and then the rear end of the tray is rested for a short time on the rest P, so that the surplus coating material C can drip back into the pan B, and then the tray with the coated marshmallows thereon is turned over, to allow the coating material to set and dry, after which the biscuits or cakes E with the coated marshmallows thereon are removed from the resting devices F. As previously stated, the supports H are lowered from time to time to compensate for the used up coating material C contained in the pan B.

From the foregoing it will be seen that by the arrangement described a large number of marshmallows can be quickly and uniformly coated with a suitable coating material and without danger of submerging the biscuits or cakes in the coating material.

Having thus described my invention, I claim as new and desire to secure by Letters Patent:

1. A dipping machine for coating marshmallows held on biscuits or cakes, comprising a pan for containing the coating material, an adjustable tray support above the level of the coating material contained in the said pan, and a tray adapted to be placed on the said tray support in an upside down position, the tray having spaced retaining devices on one face for entering and supporting the cakes and the marshmallows to be coated, the said retaining devices allowing reversal of the tray with the cakes and marshmallows suspended therefrom for dipping the marshmallows in the coating material contained in the said pan.

2. A dipping machine for coating marshmallows held on biscuits or cakes, comprising a pan for containing the coating material, an adjustable tray support above the level of the coating material contained in the said pan, a tray adapted to be placed on the said tray in an upside down position, the tray having spaced retaining devices on one face for entering and supporting the cakes and the marshmallows to be coated, the said retaining devices allowing reversal of the tray with cakes and marshmallows suspended therefrom, for dipping the marshmallows in the coating material contained in the said pan, means for raising and lowering the said tray support, and means for limiting the downward movement of the said tray support, to control the depth the marshmallows pass into the coating material.

3. A dipping machine for coating marshmallows held on biscuits or cakes, comprising a pan for containing the coating material, an adjustable tray support in the said pan, a tray adapted to rest on the said support and provided on its under side with spaced retaining devices for the biscuits or cakes to which the marshmallows are attached, and a bracket on the said pan for resting one end of the tray thereon, to allow the surplus coating material to drip back into the pan.

In testimony whereof I have signed my name to this specification in the presence of two subscribing witnesses.

WILLIAM B. CROCKER.

Witnesses:
AUG EITZEN,
H. H. BECKER.